United States Patent

Lohner

[11] 4,034,632
[45] July 12, 1977

[54] PNEUMATICALLY OPERATED ROD WORKPIECE FEED MECHANISM FOR TURNING MACHINES

[76] Inventor: Alfred Lohner, Sagmuhlstrasse 1, Augsburg, Germany, 8900

[21] Appl. No.: 707,504

[22] Filed: July 22, 1976

[30] Foreign Application Priority Data

July 26, 1975 Germany .......................... 2533502

[51] Int. Cl.² ...................................... B23B 13/00
[52] U.S. Cl. ................................................ 82/2.5
[58] Field of Search ............. 82/38, 38 A, 2.5, 2.7; 214/1.14

[56] References Cited
U.S. PATENT DOCUMENTS

| | | | |
|---|---|---|---|
| 3,081,522 | 3/1963 | Lakins | 82/2.5 |
| 3,621,740 | 11/1971 | Thomas | 82/2.5 |
| 3,696,696 | 10/1972 | Bechler | 82/2.5 |

Primary Examiner—Harrison L. Hinson
Attorney, Agent, or Firm—McGlew and Tuttle

[57] ABSTRACT

A pneumatically operated rod workpiece feed mechanism for rod working turning machines comprises a hollow feed tube which has a closed end and an opposite open end through which the rod workpiece is adapted to be fed. An axially displaceable feed piston is arranged in the feed tube and it is movable by a first fluid pressure supply means for applying and removing pressure to the feed tube in order to shift the feed piston backwardly and forwardly. The feed piston includes a first piston part which comprises a tubular member having a closed end with a fluid pressure opening adjacent the closed end permitting inflow of the fluid pressure into the first part in order to extend the second part which is displaceable in the first part. A cam control is mounted on the feed tube and projects into the path of movement of the feed piston and is displaceable by movement of the feed piston beyond a predetermined point to regulate the first fluid pressure supply means to control the movement of the feed piston. The second fluid pressure supply means is connected to the cam control in order to operate centering rollers which may be moved radially inwardly to engage the workpiece or outwardly to permit entry of the workpiece into the feed tube.

7 Claims, 3 Drawing Figures

PNEUMATICALLY OPERATED ROD WORKPIECE FEED MECHANISM FOR TURNING MACHINES

FIELD AND BACKGROUND OF THE INVENTION

This invention relates in general to the construction of devices for orienting workpieces in a turning machine and, in particular, to a new and useful device using a fluid pressure control for positioning a workpiece into association with a centering head of a telescopic feed tube and also for positioning a plurality of radially shiftable rollers into association with the workpiece at a spaced location from the centering head in accordance with the position of the operating piston.

DESCRIPTION OF THE PRIOR ART

Rod feed mechanisms are known which broadly stated, have proven to be satisfactory in practice, for example, U.S. Pat. No. 2,572,741. However, they have various drawbacks which are due more or less to circumstances which are somewhat interconnected.

With a rod feed mechanism of the prior art, the total feed motion must be produced by a single part of the insert received in the rod feed tube and, accordingly not only the overall axial length and, thereby, the space needed for installation is very large, but also oscillations are produced to a considerable extent. That is, the frequently non-circular rods are supported only in the centering head of the feed part which is held in the feed tube by means of a bushing. Such oscillations destroy the working tools within a short time so that the life of the tools is short and work interruptions for the change are unavoidable. This considerably affects the manufacture and makes it expensive. Further, in the rod feed devices of the prior art, in order to prevent deflection and to produce the necessary feed forces with a low air pressure, the diameters of the long feed tube and also of the feed piston are larger than the inside diameter of the machine spindle, so that the respective part can be introduced into the spindle only partly. The result is that frequently the rods cannot be worked up to the end, remnants are left and the length of the machine spindle is not fully utilized for the feed.

SUMMARY OF THE INVENTION

The present invention is directed to an improvement of a pneumatically operated rod feed mechanism of the above mentioned design, making it possible to fully utilize both the length and diameter of the hollow spindle of the respective machine tool and to work up the fed material completely. Further, in order to prevent oscillations and, thereby, reduce the frequency of work interruptions, the rods should be reliably supported in the vicinity of the entrance of the spindle hole of the machine tool, without affecting the feed of the material.

In accordance with the invention, the feed piston comprises two piston parts which are adapted to telescope one within the other and of which the first part forms the outer, rear, portion of the piston and has the shape of a tubular body which is provided with a perforated piston surface. The first part concentrically surrounds the second part which is also provided, on its side remote from the spindle hole, with a piston surface and carries, on its front end facing the spindle hole, a centering head forming a part of the front portion of the piston. A control cam is located in the travel path of the first part of the piston at the inside surface of the feed tube, for controlling a compressed-air-operated closing and opening motion, in the manner of an iris-diaphragm, of a self-centering backrest which is mounted between the feed tube and the spindle hole and serves the purpose of fixing the rod radially, in a manner known per se, by means of three rollers, while letting the centering head pass therethrough. The pneumatic pressure for operating the feed piston is adjustable independently of the pneumatic pressure for actuating the self-centering backrest.

As compared to the prior art, the inventive rod feed mechanism has the advantage that the spindle hole of the working machine can be fully utilized as to both its length and diameter for the feed of the rods, and the rods can be worked up completely. In addition, near the entrance of the spindle hole, the rods are reliably supported by means of a backrest so that a permanently satisfactory feed and holding is ensured. This prevents oscillations so that the working tools have a substantially longer life and the economy of manufacture is considerably increased.

Also, the axial overall length of the inventive rod feed mechanism is small since the feed piston acting on the rods to be worked is assembled of two telescoping parts and can be retracted while the rod is put in place. Therefore, although the feed piston is relatively short, the material can be advanced, by means of the second part of the piston, through the spindle of the machine and, consequently, worked up completely. A guidance within the machine spindle is ensured by the centering head of the piston.

The backrest for supporting the rods is advantageously designed as a self-centering backrest; such devices are disclosed, for example, in U.S. Pat. Nos. 3,621,740 and 3,535,963.

Accordingly, it is an object of the invention to provide a fluid pressure operated workpiece feed mechanism for rod working turning machines which comprises a hollow feed tube through which the workpiece is adapted to be fed and which contains a feed piston having an outer first part with a closed end having a pressure opening therein for generating pressure within the outer part against a closed end of an inner piston part which is displaceable and which carries a centering head for the workpiece at its opposite end and which includes a centering backrest comprising a plurality of radially extending rollers mounted at spaced locations around the circumference of the feed tube with separate fluid pressure means for operating both the displacement of the piston and the centering backrest which is engageable with the workpiece.

A further object of the invention is to provide a fluid pressure operated workpiece feed mechanism for rod working turning machines which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

In the drawings:

FIG. 2 is an enlarged partial section of the apparatus shown in FIG. 1; and

DESCRIPTION OF THE PREFERRED EMBODIMENT

Figure 1:
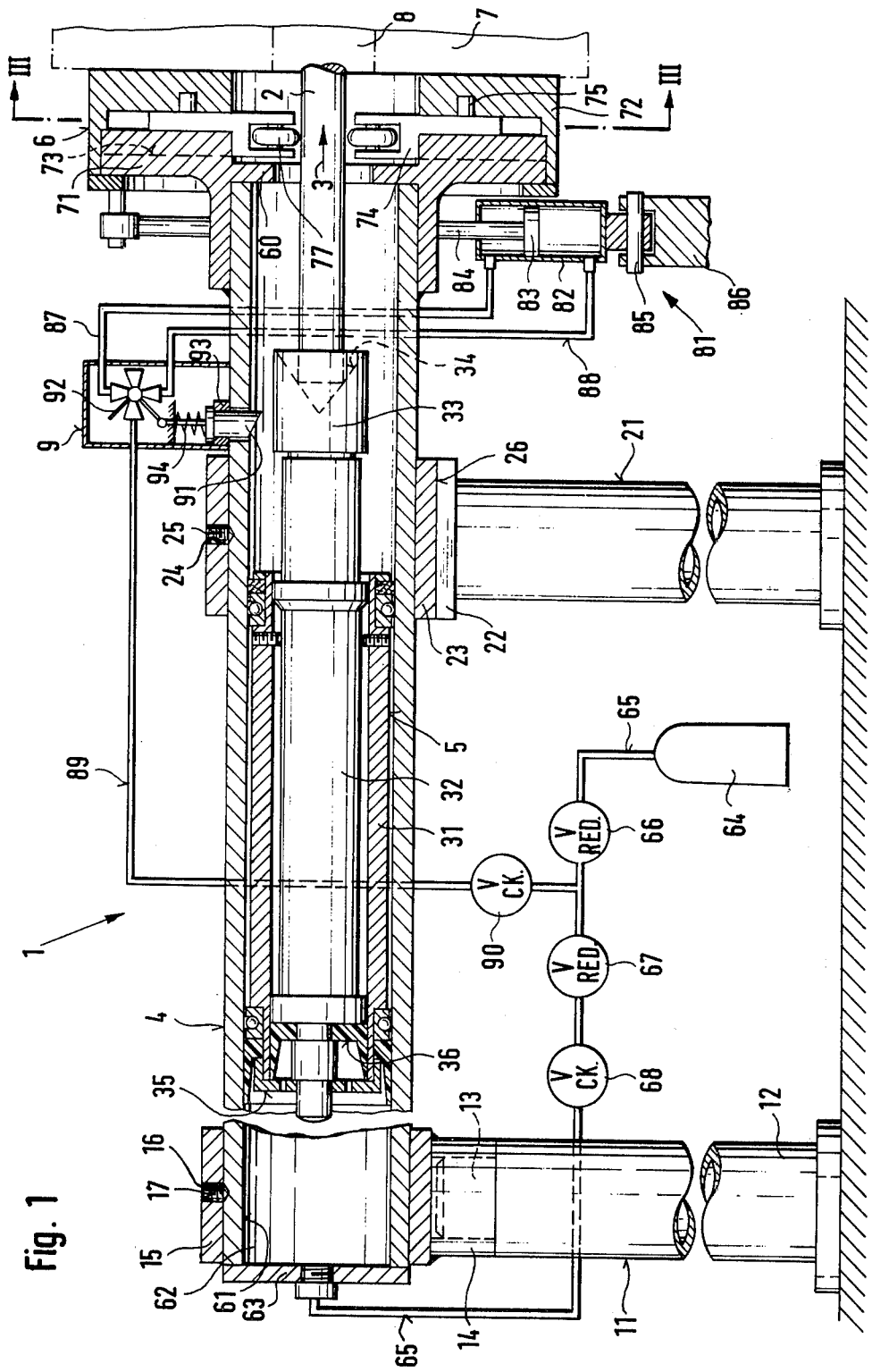
FIG. 1 is an axial sectional view of a rod feed mechanism constructed in accordance with the invention.

Referring to the drawings in particular, the invention embodied therein, comprises a fluid pressure operated rod feed mechanism which includes two supporting posts 11 and 21 which support a rod feed tube 4. A feed piston 5 is mounted in feed tube 4 for axial displacement and it is provided with a centering head 33 for centering a workpiece or rod W within the open end or spindle hole 8 of feed tube 4. A self-centering backrest mechanism 6 includes a plurality of radially arranged rollers which surround the workpiece and which are movable radially inwardly or outwardly under the control of a fluid pressure drive motor or fluid pressure operating means 81. The fluid pressure rod feed mechanism includes a separate fluid control for displacing the feed piston 5 for the purpose of pushing the workpiece W in the direction of the arrow 3 through the spindle hole 8 of a machine tube, generally designated 7, which is only partly shown. A control device 9 is provided for controlling the position of backrest 6 to permit it to open automatically and to close after the workpiece is inserted.

Post 11 which supports feed tube 4 at the end remote from working machine 7, comprises a lower part 12 and an upper part 14. Upper part 14 of post 11 is provided with a sleeve 15 for receiving rod feed tube 4. Lower part 12 of the post is provided with a pivot 13 which engages upper part 14 so that the upper part and, thereby, sleeve 15, can be pivoted laterally. For arresting tube 4 in sleeve 15, one or several setscrews 17 are provided which are screwed into radially extending tapholes 16 of sleeve 15.

Post 21, on the other hand, is provided on its top with a horizontal plate 22 on which a sleeve 23 is supported. Sleeve 23 is firmly connected to feed tube 4 by means of set-screws 25 screwed into tapholes 24 and its surface 26 is adapted to slide on plate 22. With design, it is made possible, for inserting a rod 2, to swing rod feed tube 4 to the side so that it is not necessary to introduce the rod through the spindle of the machine.

Feed piston 5 comprises two telescoping piston parts 31 and 32. Piston part 32 with the smaller diameter carries, on its front end, a centering head 33 which is coaxially rotatable about this end and is provided with a centering bore 34. Centering bore 34 is made in the front face of centering head 33 and tapers inwardly in the rearward direction, and is intended to receive the rear end of the rod 2 to be fed.

Rod 2 to be worked is fed through a spindle hole 8 of working machine 7 into a chuck (not shown). Every time the chuck is released, the rod is advanced in the direction of arrow 3 and by means of feed piston 5 of feed mechanism 1, up to a stop of working machine 7.

Feed piston 5 is operated with fluid pressure and preferably pneumatically. For this purpose, a source 64 of compressed air is provided which supplies compressed air, through a pressure line 65, into the pressure space 62 of feed tube 4 which is closed by a cover 63.

Backrest 6 which is mounted at the front end of rod feed tube 4, has a passage diameter which is smaller than the inside diameter of tube 4 whereby a stop 60 is formed for feed piston 5. This prevents first part 31 of the piston from butting against the front face of the rotating spindle of working machine 7.

Figure 2:
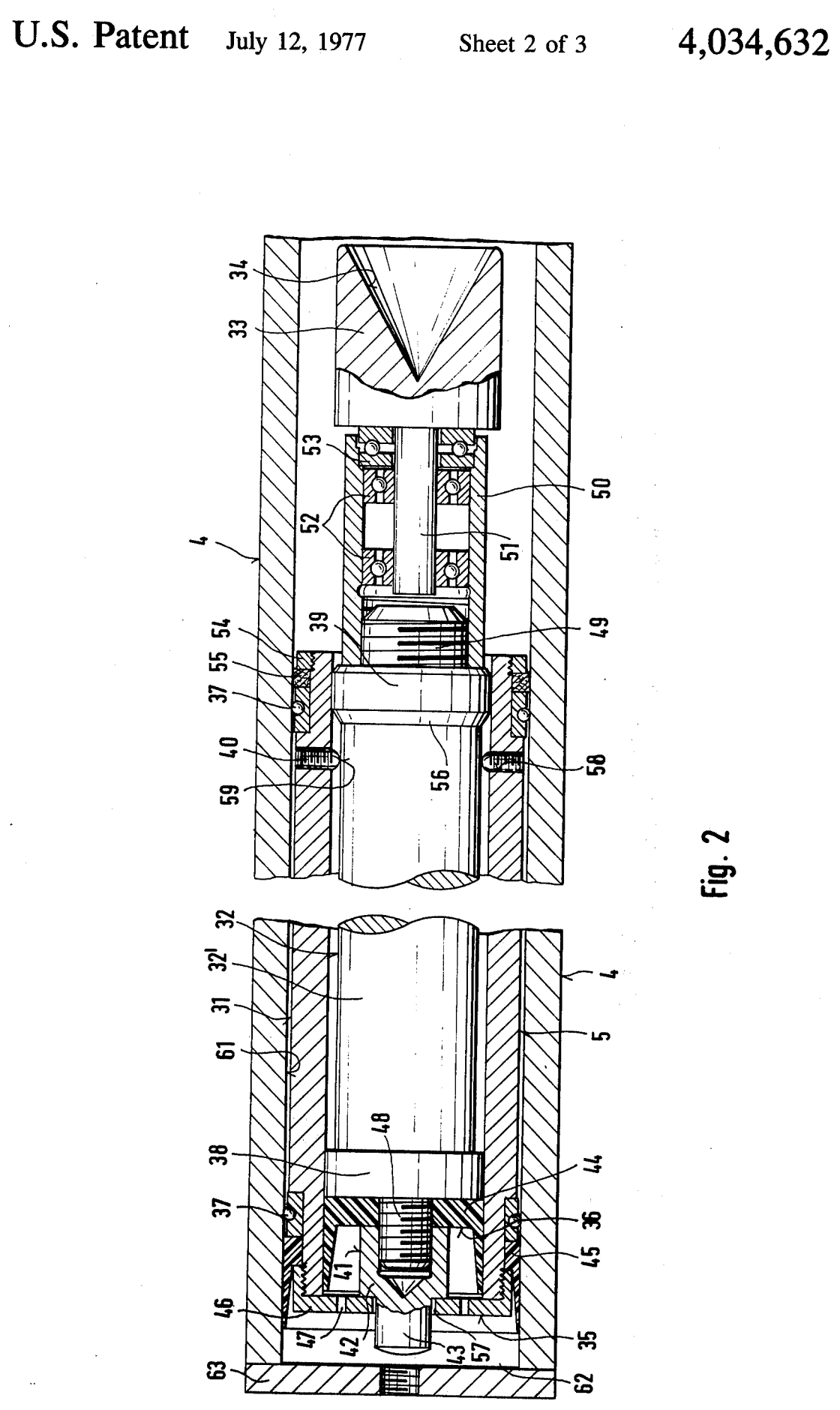

As shown in FIG. 2, the two parts 31, 32 of feed piston 5 which are displaceable relative to each other form a telescoping assembly in which first piston part 31, having a larger diameter, has the shape of a receiving cylinder in which second piston part 32 is slidably received for axial displacement.

At its ends, the tubular body of the first piston part is provided with antifriction bearing rings 37, the radially slightly projecting balls of which run on the inside surface 61 of feed tube 4. Outside and adjacent bearing ring 37 at the front end, a scraper ring 55 is provided and is made, for example, of hard felt, and the two rings 37 and 55 are held in place by means of a retaining nut 54 screwed to an external thread on the front end of piston part 31. At the rear end, antifriction bearing ring 37 is followed by a packing sleeve 45 made for example, of PVC. Here, ring 37 and sleeve 45 are held in position by a cover 46 which is screwed to the threaded rear end of piston part 31 and is provided with apertures 47, thus forming a perforated piston surface 35. Packing sleeve 45 seals first piston part 31 against the cylindrical inside surface 61 of rod feed tube 4.

The cylindrical inside surface 61 is identical with the cylindrical slide surface of telescopic feed piston 5, the second part 32 of which is guided in first part 31 by means of a rear collar 38 and a front collar 39. Front collar 39 blends continuously, for example, tapers, through a conical surface 56, to the smaller diameter of a central shaft 32' of this part 32. On its front edge, collar 39 is slightly rounded of chamfered (FIG. 2). The front end portion of part 32 is a thread bolt 49 to which a bushing 50 having an internal thread at the rear is screwed. In the interior of bushing 50, two radial bearings 52 and a thrust bearing 53 are provided, in which a pivot pin 51 of centering head 33 is mounted. This makes centering head 33, which is provided with the conical central bore 34, rotatable relative to second piston part 32.

The rear end of second piston part 32 is also a thread bolt 48 over which a packing sleeve 44 is engaged which is made, for example, of PVC. The outwardly extending rear surface of sleeve 44 forms a piston surface 36 and its front face applies against the rear face of guide collar 38 of second piston part 32. Packing sleeve 44 is held in place by means of a spacer part 41 which is screwed to thread bolt 48 and is provided with a corresponding internal thread. As shown, spacer part 41 is stepped and comprises a portion 42 having a larger diameter and a portion 43 having a smaller diameter. Portion 43 extends through a central bore 57 of the retaining cover 46 of packing sleeve 45. The axial lengths of portions 42, 43 are chosen, with respect to the axial lengths of packing sleeves 44 and 45, so as to ensure that the rear lips of packing sleeve 44, 45 are protected against squeezing, that is, portions 42, 43 butt against the respective opposite surfaces of retaining cover 46 and rear cover 63 of rod feed tube 4.

Near the front end of first piston part 31, radial tapholes 58 are provided which are distributed over the circumference and in which guide bodies 40 in the form of setscrews are screwed. The inside ends 59 of guide bodies 40 are spherical and slidably fit the outer periphery of shaft portion 32'. Guide bodies 40 serve, on the one hand, to an additional centering of second piston part 32 within first piston part 31 and, on the other hand, as a stop by which, in cooperation with rear guide collar 38, the full extension of telescoping piston 5 is limited.

In this embodiment, the outer diameter of first piston part 31 must be larger than the inside diameter of spindle hole 8 of the respective working machine 7. The outside diameters of centering head 33, bushing 50 and front guide collar 39, on the contrary, must be slightly smaller than the diameter of the spindle hole of the machine to permit second piston part 32 to reach a fully extended state to penetrate entirely into spindle hole 8 of machine 7.

The outside diameter of centering head 33 slidably fits the hollow spindle 8 of machine 7. Thereby, it is made certain that even the remnant of the rod to be worked is radially guided at its rear end, after this end has been advanced into spindle hole 8 of the machine, so that undesirable oscillations are prevented.

The axial lengths of second piston part 32, bushing 50, centering head 33, and the arrangement of guide bodies 40 in piston part 31 are chosen so that with second piston part 32 fully extended, the front portion of second piston part 32 axially projecting beyond the front face of piston part 31, bushing 50, and centering head 33, which together form the front portion of feed piston 5, have an axial length which is equal to the length of the spindle of the respective working machine 7, plus a length of at least 30 mm. This makes it sure that every time the front face of piston part 21 butts against stop 60, rod 2 which is then fed by the advancing second piston part 32 of rod feed mechanism 1 into working machine 7, can be machined up to its end. Should a remnant be left, this remnant may be pushed out by mechanism 1 in the forward direction, through the released chuck.

With a fully retracted second piston part 32, as shown in FIG. 2, the axial distance between the front face of centering head 33 and the front face of piston part 31 is greater than the axial distance of stop 60 from the entrance face of the spindle of the respective working machine 7. This ensures that centering head 33 is introduced into spindle hole 8 and fixes the rod end 2 radially prior to the instant at which piston part 31 abuts stop 60.

The rear face of piston part 31 and the outer rear face of packing sleeve 45 form together an annular piston surface which is slightly larger than the rear piston surface 36 of second piston part 32 which is formed by the rear face of packing sleeve 44 and spacer part 41. This ensures that upon admitting compressed air, from a source 64 through a pressure line 65, into pressure space 62 of rod feed tube 4, first piston part 31 along with second piston part 32 which, at that instant, is not yet displaced relative to part 31, thus the entire feed piston 5 as a unit, is advanced, and second piston part 32 along with bushing 50 and centering head 33 are pushed out from first piston part 31 only after the front face of part 31 butts against stop 60. Thereby, it is ensured that even after first piston part 31 of piston 5 butts against stop 60, the feed of rod 2 continues, so that the entire rod can be completely worked up. Since that portion of rod 2 which is to be further fed by means of piston part 32 has only a length which is equal to the length of the spindle of machine 7, greater feed forces are no longer needed and the pressure acting on the smaller, rear, piston surface 36 of second piston part 32 is completely sufficient for feeding this short, remaining portion of the rod.

The diameter of the front opening of centering bore 34 of head 33 is, advantageously, only slightly smaller than the outside diameter of centering head 33, which ensures that the diameter of spindle hole 8 of the respective working machine 7 can also be utilized almost completely for feeding rod material of corresponding thickness. It is advisable to round the front edge of centering head 33 approximately as shown to ensure an easy introduction of head 33 into the hole of the machine spindle.

In order to additionally support the rods to be fed before they enter the spindle hole, particularly as is frequently necessary in cases where the rods are long and thin relative to the spindle hole of machine 7, feed tube 4 is equipped with a diagrammatically shown, self-centering backrest 6. Backrest 6 comprises a disc-shape guide body 71 which is secured to the front end portion of rod feed tube 4 and extends perpendicularly to the axis thereof, and a cam disc 72 (FIG. 3) which is mounted for rotation and secured against axial displacement. On the side of guide body 71 facing cam disc 72, radially extending guide grooves 73 are provided at three locations at least, in which fitting sliding jaws 74 are received for radial displacement, which jaws are provided with guide pins 75 which engage spiral guide grooves 76 of cam disc 72. Upon rotation of guide body 71 relative to cam disc 72, jaws 74 are moved conjointly inwardly or outwardly, depending on the direction of rotation.

On the inside ends of jaws 74, contact rollers 77, having a periphery with a spherical cross-section, are mounted for rotation. The rollers apply against the outer surface of a rod 2 to be fed, without substantially hindering the rotary or axial motion of the rod. For the same purpose, a backrest of any other design can be used.

Figure 3:
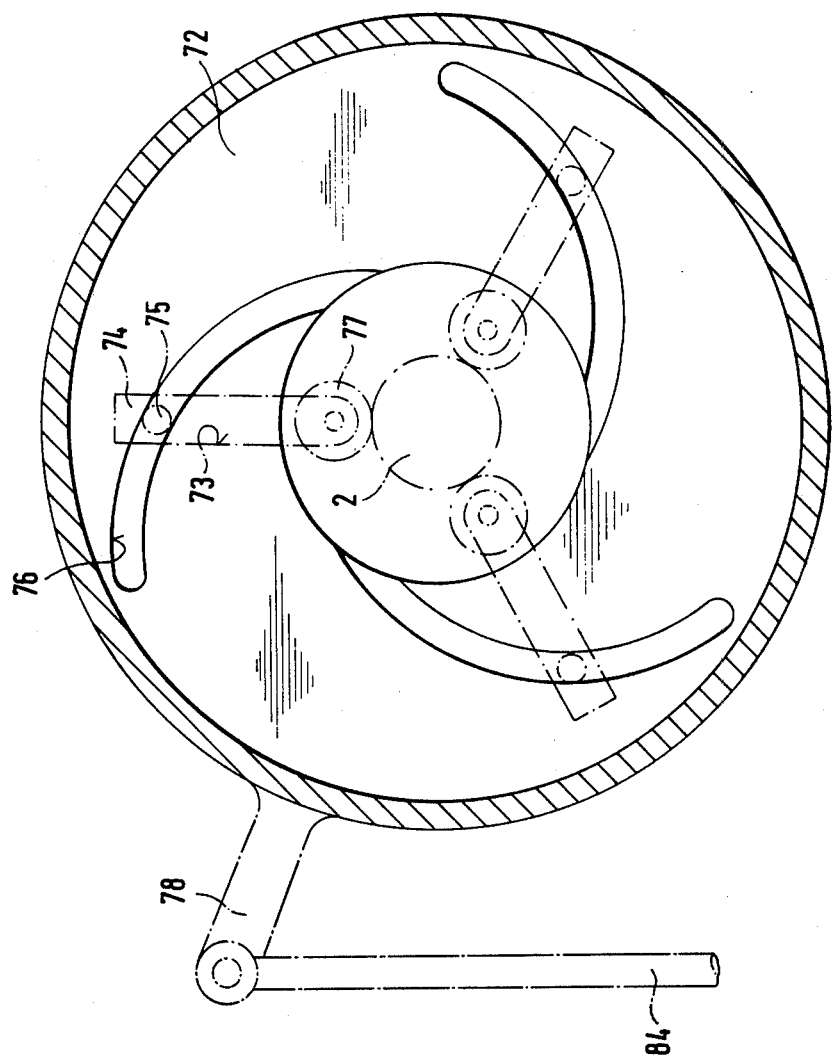
FIG. 3 is a section taken along the line III—III of FIG. 1.

As shown in FIG. 3, a lever 78 is secured to cam disc 72, to which the end portion rod 84 of a double-action pneumatic drive 81 is hinged. Fluid pressure means or the backrest drive 81 is diagrammatically shown in FIG. 1. It comprises a double-action air cylinder 82 which is mounted, by one of its ends and by means of a bolt 85, on a part 86 secured to feed tube 4 for pivoting about an axis which is parallel to the axis of feed tube 4. Air cylinder 82 encloses a piston 83 having a piston rod 84 which extends, at the other side of the cylinder, to the outside and is hinged to lever 78 of cam disc 72. The two cylinder spaces of double-action air cylinder 82 are connected, through lines 87 and 88, to a control device 9 which, in turn, is connected, through a line 89 to the fluid pressure source, namely, the compressed air line 65 and, therethrough, to the source 64 of compressed air.

Control device 9 comprises a two-way control slide 92 which is actuable by means of a cam 91 and which, in one position, connects control line 89 and, thereby, source 64 of compressed air, with line 87 which leads to one of the cylinder spaces of double-action cylinder 82, and line 88 leading to the other cylinder space, to the atmosphere, and in another slide position, connects the line 88 leading to the other cylinder space, to control line 89, and line 87 to the atmosphere.

Cam 91 actuating the two-way control slide 92 is guided for radial displacement in a guide 93 which is provided in rod feed tube 4, and is biased inwardly by a spring 94 so that the inside end of the cam projects into the path of first piston part 31. With part 31 in motion, cam 92 is pushed by the front edge of part 31 radially to the outside against the action of spring 94 as soon as piston 5 is advanced past this location.

In its normal position under action of spring 94, two-way slide connects control line 93 with that cylinder space of cylinder 92 wherefrom, through piston 83, contact rollers 77 are actuated to press against rod 2, and with cam 91 pushed back by the front edge of first piston part 31 moving therepast, control slide 92 is brought into a position in which control line 89 is connected with that cylinder space of double-action cylinder 82 wherefrom piston 83 is displaced to move jaws 74 radially toward the outside.

Cam 91 is mounted on rod feed tube 4 at a location ensuring that jaws 74 are moved back from their position in which they press against rod 2, as soon as the front edge of centering head 33 has approached contact rollers 77 to a close distance of some millimeters. The displacement of actuating piston 83 from its one limit piston into the other causes jaws 74 to retract so far that second piston part 32 can freely pass between contact rollers 77.

The compressed air lines 65 and 89 supplied from source 64 may be designed for operation in two pressure stages, as shown in FIG. 1; one pressure stage of medium operational pressure of approximately 2.5 bar is provided for control line 89 and a low pressure stage of approximately 1.2 to 1.5 bar is provided for the advance of feed piston 5. To this end, a pressure relief valve 66 is mounted in pressure line 65 between source 64 and the location where control line 89 is branched off, and another pressure relief valve 67 is mounted in line 65 between this location and pressure space 67. A shut-off valve 90 with a vent is provided in control line 89 and another shut-off valve 68 with a vent is provided in pressure line 65.

Shut-off valve 68 mounted in the low pressure line may be connected to a circuit-breaking device of working machine 7 by which, as soon as the rod is worked up, the machine is arrested, the chuck is opened for a perhaps necessary ejection of the rod remnant and, thereupon, shut-off valve 68 is brought in a position in which pressure line 65 is shut off and pressure space 62 of rod feed tube 4 is vented.

While a specific embodiment of the invention has been shown and described in detail to illustrate the application of the principles of the invention, it will be understood that the invention may be embodied otherwise without departing from such principles.

What is claimed is:

1. A fluid pressure operated rod workpiece feed mechanism for turning machines, comprising a hollow feed tube having a closed end and an opposite open end through which the rod workpiece is adapted to be fed, an axially displaceable feed piston in said feed tube, said feed piston having a first part and a second part telescopically received in said first part and having an end adjacent the open end of said feed tube with a rod workpiece centering head for receiving the rear end of the workpiece to be fed, said first piston part comprising a tubular member having a closed end with the end adjacent said feed tube closed end and with a fluid pressure opening therethrough, said second part being displaceable in said first part, a cam control mounted on said feed tube and projecting into the path of said feed piston, a backrest assembly including a plurality of radially arranged actuating rollers on said feed tube and being radially displaceable in said feed tube inwardly for engagement with the workpiece and outwardly to clear the periphery of said workpiece and said second part therebetween, and fluid pressure supply means connected to said cam control, said cam control having separate means for directing the fluid pressure supply to said feed tube for displacing said feed piston and to said backrest assembly for displacing said centering rollers.

2. A fluid pressure operated rod workpiece feed mechanism for turning machines, according to claim 1, including an antifriction bearing ring around said feed piston first part adjacent each of its ends.

3. A fluid pressure operated rod workpiece feed mechanism for turning machines, according to claim 1, wherein said feed piston second part has first and second spaced collars surrounding it at axially spaced locations and projecting radially outwardly from a central portion thereof, guide means on said first part located on said central part of said second part and being guided over said central part between said collars, said guide means capturing said second part within said first part.

4. A fluid pressure operated rod workpiece feed mechanism for turning machines, according to claim 3, wherein said guide means comprises guide body members displaceably mounted in said first part for movement radially outwardly and inwardly and comprising a threaded setscrew threaded into said first part.

5. A fluid pressure operated rod workpiece feed mechanism for turning machines, according to claim 1, wherein said feed piston second part has a spacer secured to the end thereof adjacent said closed end of said first part, a packing sleeve disposed between said spacer and said second part and having a portion peripherally engaged with said first part, said first part having a closed end formed by a cover threaded onto said first part, said cover having perforations therein forming the opening for the fluid pressure, said first part having a packing ring around its periphery engageable with said feed tube, said spacer corresponding in length substantially to the length of said packing and acting to abut against the closed end of said feed tube so as to prevent squeezing of said packing.

6. A fluid pressure operated workpiece feed mechanism for turning machines, according to claim 1, wherein said cam control member comprises a control slide, said fluid pressure means comprising a compressed air tank connected to said slide and control circuits connected between said slide and said feed tube and said backrest.

7. A fluid pressure operated rod workpiece feed mechanism for turning machines, according to claim 1, wherein said fluid pressure source comprises a common air supply tank, connecting lines extending from said supply tank to said feed tube and said cam control means, a fluid pressure drive for said backrest for moving said rollers inwardly and outwardly, control lines connecting from said cam control to said fluid pressure motor, first and second pressure relief valves connected between said control tank and said feed tube arranged in series, said first pressure relief valve reducing an initial pressure of approximately 2.5 bar serving as a contact and lifting pressure for the self-centering backrest, a connection line between said first and second pressure valves to said cam control and to said backrest, said second valve reducing to a lower pressure of approximately 1.2 to 1.5 bar being connected to said feed tube.

* * * * *